United States Patent [19]
Asami

[11] Patent Number: 5,702,146
[45] Date of Patent: Dec. 30, 1997

[54] FASTENER ASSEMBLY FOR SECURING A WINDSHIELD ON A VEHICLE BODY

[75] Inventor: Goro Asami, Tochigi-ken, Japan

[73] Assignee: Nifco, Inc., Japan

[21] Appl. No.: 701,033

[22] Filed: Aug. 21, 1996

Related U.S. Application Data

[63] Continuation of Ser. No. 333,452, Nov. 2, 1994, abandoned.

[30] Foreign Application Priority Data

Dec. 10, 1993 [JP] Japan ................. 5-071912
Dec. 28, 1993 [JP] Japan ................. 5-075193

[51] Int. Cl.$^6$ ........................................... B60J 1/02
[52] U.S. Cl. ............ 296/96.21; 296/201; 296/146.15; 52/204.62
[58] Field of Search .................. 296/201, 146.15, 296/96.21; 24/295, 306, 458, 555, 562, 563; 52/208, 204.591, 204.62; 248/205.2

[56] References Cited

U.S. PATENT DOCUMENTS

| | | | |
|---|---|---|---|
| 3,471,903 | 10/1969 | Northrup et al. | 24/306 |
| 3,668,808 | 6/1972 | Perina | 49/465 |
| 3,732,600 | 5/1973 | Perina | 24/306 X |
| 3,745,709 | 7/1973 | Perina | 49/465 |
| 5,152,593 | 10/1992 | Domenig | 248/205.2 X |
| 5,413,397 | 5/1995 | Gold | 52/208 X |
| 5,429,875 | 7/1995 | Okamoto et al. | 24/306 X |

FOREIGN PATENT DOCUMENTS 3-205001 of 1991 Japan.

*Primary Examiner*—Dennis H. Pedder
*Attorney, Agent, or Firm*—Skjerven Morrill Macpherson Franklin & Friel; Thomas S. MacDonald

[57] ABSTRACT

Provided is a fastener assembly for temporarily securing a windshield made of sheet glass when mounting the windshield on a windshield frame or an internal flange of an opening of a vehicle body by using a bonding agent. The fastener assembly consists of two fastener halves adapted to be secured to the windshield and the vehicle body, respectively, and a multitude of mushroom-shaped projections are provided on each of the mutually opposing surfaces of the two fastener halves to engage and disengage the two fastener halves at will. The fastener half mounted on the vehicle body is provided with a locating structure for preventing the movement of the fastener half from moving along the peripheral edge of the internal flange of the windshield frame. Preferably, the fastener half mounted on the vehicle body is provided with a seating surface, and the fastener half attached to the windshield is provided with a projection which rests upon the seating surface so that the weight of the windshield can be conveniently supported by this seating surface, and the mounting of the windshield can be thereby more efficiently and accurately carried out.

2 Claims, 9 Drawing Sheets

FASTENER ASSEMBLY FOR SECURING A WINDSHIELD ON A VEHICLE BODY

This application is a continuation of application Ser. No. 08/333,452, filed Nov. 2, 1994, now abandoned.

TECHNICAL FIELD

The present invention relates to a fastener assembly for temporarily securing a windshield on a window frame of a vehicle body when permanently mounting the windshield on the vehicle body by using a bonding agent, and in particular to such a fastener assembly comprising a first fastener half adapted to be secured to a vehicle body, a second fastener half adapted to be secured to a windshield, and engagement means for readily joining these two fastener halves together.

BACKGROUND OF THE INVENTION

In recent years, it has been a common practice to attach a windshield made of sheet glass to a window frame or an internal flange of an opening of a vehicle body by using a bonding agent to achieve a flush surface. Normally, a molded member is fitted in the gap between the outer edge of the windshield and the surrounding part of the vehicle body. Because the bonding agent normally requires a certain time period before it is fully cured, it is necessary to temporarily secure the windshield at its proper position on the window frame.

To this end, the Inventor has previously proposed in copending U.S. patent application Ser. No. 08/224,916 filed Apr. 4, 1994, now U.S. Pat. No. 5,598,609, a fastener assembly consisting of a first fastener half adapted to be secured to a vehicle body with a metallic clip or the like, a second fastener half adapted to be secured to a windshield with a two-sided adhesive tape or the like, and engagement means for readily joining these two fastener halves together. The contents of this copending U.S. patent application is hereby incorporated in the present application by reference.

The engagement means comprises a multitude of mushroom-shaped projection provided on the opposing surfaces of the two fastener halves. For details of this engagement means reference should be made to Japanese patent laid open publication (kokai) No. 03-205001 filed by the assignee of the present application. This engagement means allows the two halves of the fastener assembly to be attached and detached to and from each other at will simply by pushing them toward each other and pulling them apart, respectively.

According to the fastener assembly proposed in this copending US patent application, the clip is provided with barbs for firmly securing the second fastener half onto the internal flange of the window frame of the vehicle body. However, it was found that in some cases these barbs may not be adequate in securing the windshield against the movement of the windshield along the peripheral edge of the internal flange of the window frame and the tendency of the windshield was to sag down under its own weight.

Conventionally, for instance, an adjustable stopper was provided on the window frame so as to engage the lower edge of the windshield or a dam rubber piece was attached to a suitable location by using two-sided adhesive tape or the like. However, these conventional methods are not suitable for automatization, and it is particularly difficult according to these conventional methods to control the gap between the upper edge of the windshield and the window frame.

Also, it is desired to provide means for properly locating the windshield on the internal flange in a simple manner so that the gap between the outer edge of the windshield and the surrounding part of the vehicle may be constant over its entire periphery. If the size of this gap can be controlled within a relatively narrow range, it is possible not only to reduce the possibility of the occurrence of improper positioning of the windshield but also to reduce the necessary width of the molded member that is to be placed in the gap between the windshield and the surrounding part of the vehicle body. This is desirable not only from aesthetic view points but also for reducing the cost for fabricating the molded member.

BRIEF SUMMARY OF THE INVENTION

In view of such problems of the prior art, a primary object of the present invention is to provide a fastener assembly for temporarily securing a windshield to a flange of an opening of a vehicle body in both a simple and secure manner.

A second object of the present invention is to provide a fastener assembly for temporarily securing a windshield which allows the windshield to be located accurately on the windshield frame of the vehicle body with very little effort.

A third object of the present invention is to provide a fastener assembly for temporarily securing a windshield which is suited to be handled by an automated machine.

A fourth object of the present invention is to provide a fastener assembly for temporarily securing a windshield which is simple and economical.

According to the present invention, these and other objects can be accomplished by providing a fastener assembly for temporarily securing a windshield when mounting the windshield on a vehicle body, comprising: a first fastener half having first attaching means on one surface thereof for securely attaching the first fastener half to an internal flange of a windshield frame of the vehicle body, and first engagement means on another surface thereof; and a second fastener half having second attaching means on one surface thereof for securely attaching the second fastener half to a peripheral edge of the windshield, and a second engagement means provided on another surface thereof and adapted to be readily engaged and disengaged with and from the first engagement means; the first fastener half being provided with locating means for preventing movement of the first fastener half along a peripheral edge of the internal flange.

According to this structure, because the locating means allows the first fastener half to be firmly secured to the internal flange, the first fastener half is prevented from sagging under the weight of the windshield or otherwise shifting relative to the internal flange, and a proper positioning of the windshield as well as a reliable securing action for the windshield can be accomplished in a simple manner.

According to a preferred embodiment of the present invention, the first and second engagement means each comprises a multitude of mushroom-shaped projections provided on the associated surface of the associated engagement means so that the two fastener halves may be joined and detached at will, and an accurate positioning of the windshield can be ensured at all times.

The locating means may comprise a resilient piece extending from the first fastener half along a peripheral edge of the internal flange and at an angle smaller than 90 degrees with respect the plane of a surface of the internal flange and engaging the surface of the internal flange at a free end of the resilient piece. Thus, if the first fastener half is moved along a peripheral edge of the internal flange, the resilient piece will be progressively wedged against the surface of the internal flange.

Alternatively, the locating means may comprise a resilient piece provided in the first fastener half and snap fitted into a recess provided in a surface of an internal flange. Each first fastener half may be provided with a pair of such resilient pieces while the internal flange is provided with a pair of corresponding recesses so that the movement of the first fastener half in either direction along the peripheral edge of the flange may be prevented.

Typically, the first attaching means comprises a metallic clip including a resilient clamp piece which clamps the internal flange between the resilient clamp piece and a main part of the first fastener half so that the first fastener half can be easily fitted onto the peripheral edge of the internal flange. To prevent the movement of the metallic clip across the peripheral edge of the internal flange, the metallic clip may be provided with a barb which opposes a movement of the metallic clip directed across the peripheral edge of the internal flange.

Alternatively, the locating means may comprise a notch formed in the internal flange and having a pair of slanted side edges so that the metallic clip may be positioned centrally into the notch, guided by the slanted side edges, as the metallic clip is fitted onto a peripheral edge of a part of the internal flange situated in the notch.

To positively prevent the sagging of the windshield under its own weight, the first fastener half may be provided with a seating surface facing upward when mounted on the internal flange of the windshield frame while the second fastener half is provided with a projection adapted to be placed on the seating surface when the second fastener half is attached to the windshield, and the windshield is placed on the internal flange. To allow lateral adjustment of the position of the windshield, the seating surface preferably has a certain width so as to allow relative movement between the first and second fastener halves along a lateral direction of the vehicle body.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
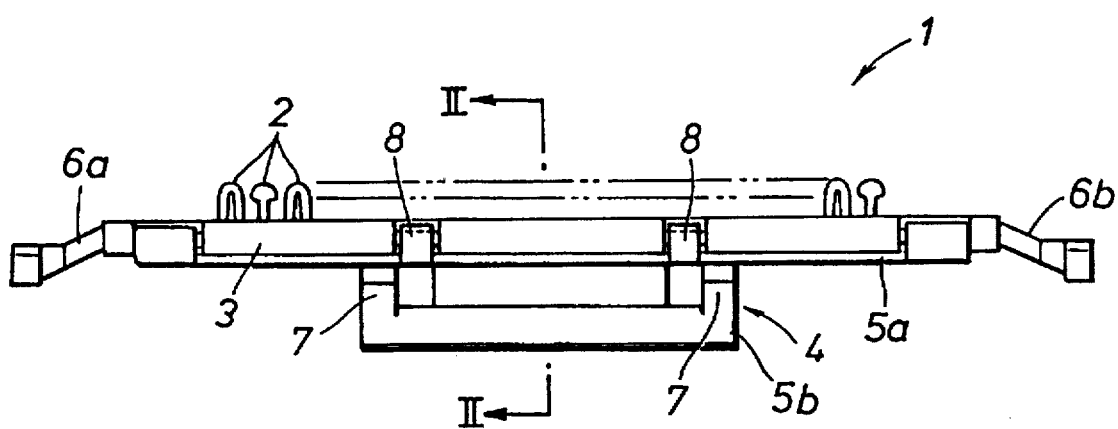
FIG. 1 is a front view of a first fastener half adapted to be mounted on a vehicle body for temporarily securing a windshield according to the first embodiment of the present invention.

FIG. 1 shows a first fastener half of a first embodiment of the fastener assembly for temporarily securing a windshield according to the present invention. This fastener half 1 comprises a base 3 made of a planar plastic strip having a multitude of mushroom-shaped projections 2 on one surface thereof in regular rows extending both laterally and longitudinally, and a metallic clip 4 mounted to a longitudinally central part thereof.

Figure 2:
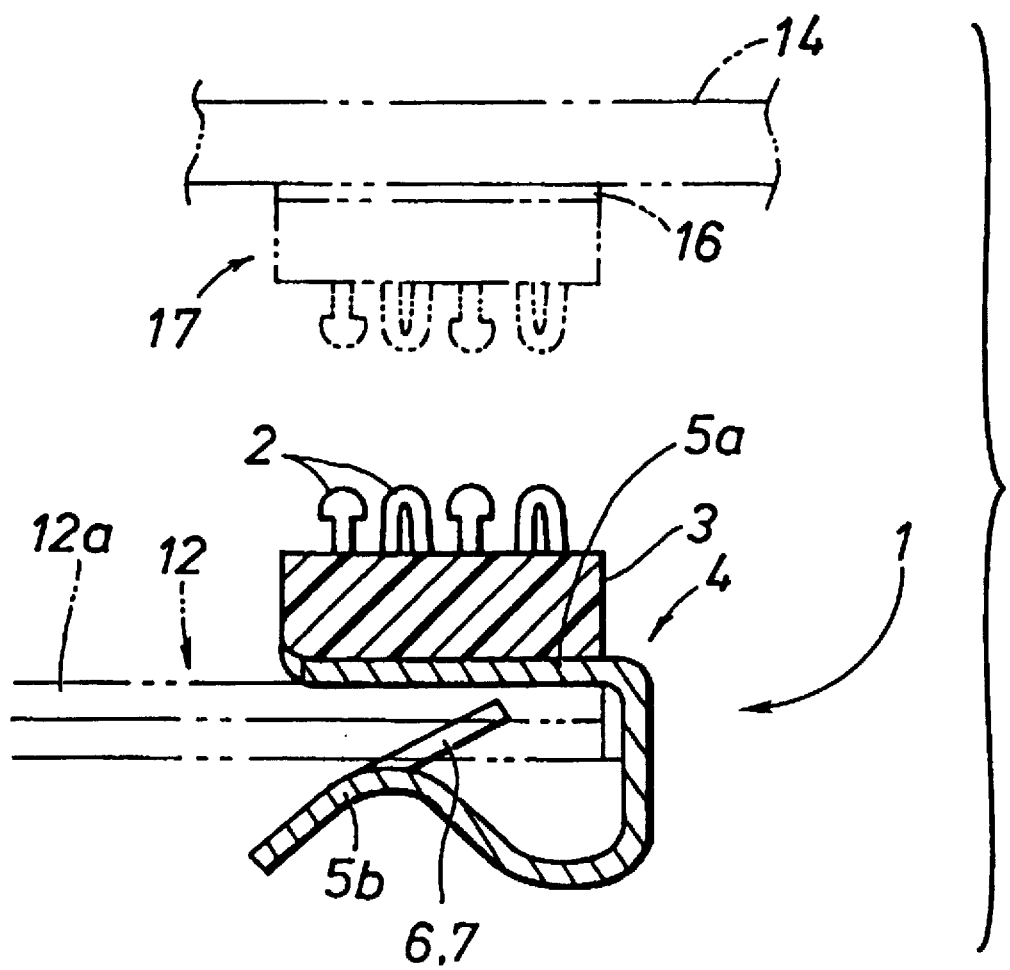
FIG. 2 is an enlarged sectional view taken along line II—II of FIG. 1 with a second fastener half indicated by imaginary lines.

The clip 4 is made by bending a T-shaped sheet metal such as steel plate so as to have a U-shaped cross section as shown in FIG. 2, and comprises a relatively broad base mounting portion 5a, and a clamping piece 5b provided with barbs 7 which are cut out of the same sheet metal on either lateral end of the clamping piece 5b. The clip 4 is secured to the base 3 by placing the base 3 over the base mounting portion 5a and crimping a plurality of tabs 8 provided on the base mounting portion 5a onto the base 3. The longitudinal ends of the base 3 are each provided with a resilient engagement piece 6a or 6b.

Referring to FIG. 2, the first fastener half 1 is adapted to be mounted on a flange 12 of a i.e. windshield opening of the vehicle body, and this flange 12 consists of two layers of panel members, and the outer panel 12a or the panel facing a windshield 14 is provided with a pair of notches 13a and 13b (FIG. 3), for each fastener assembly, serving for engaging the above mentioned resilient engagement pieces 6a and 6b.

Figure 3:
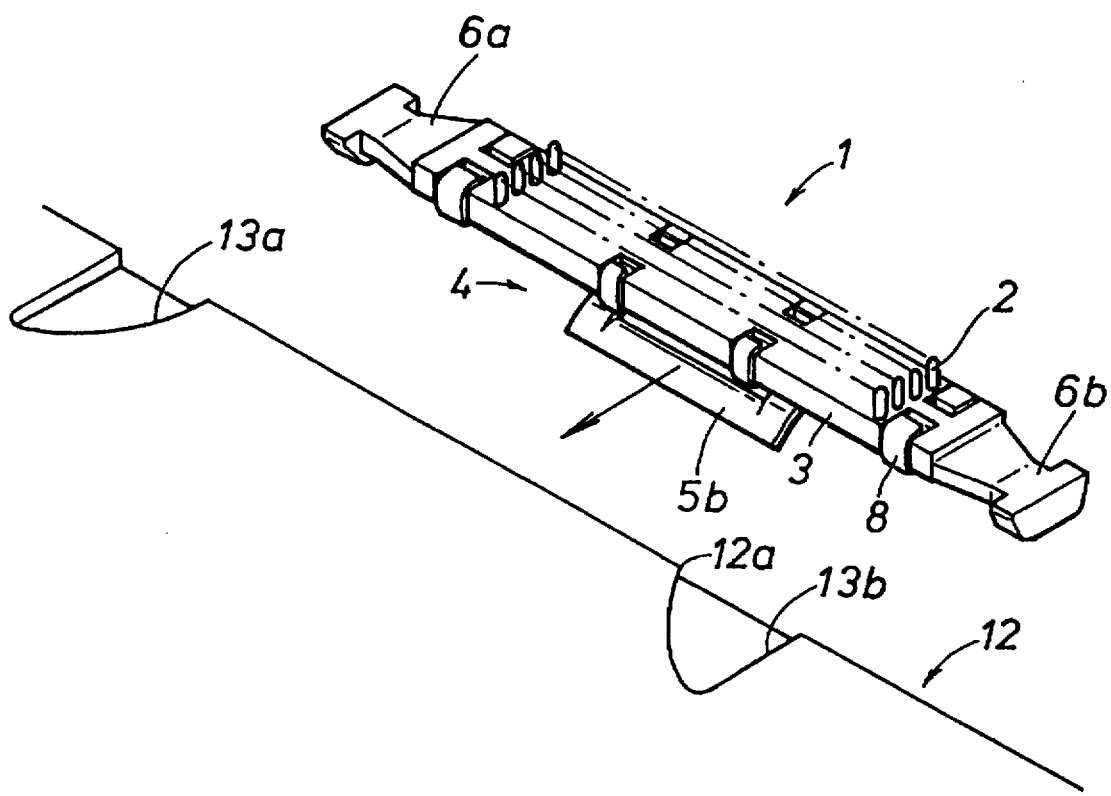
FIG. 3 is a perspective view of the first fastener half showing how it can be fitted on an internal flange of a windshield opening of the vehicle body.

As illustrated in FIG. 3, when this clip 4 is fitted onto an edge of the internal flange 12 provided in the windshield opening of the vehicle body, the barbs 7 projecting inwardly in the clip 4 firmly secure the clip 4 to the flange 12 along with the base 3 attached thereto. At the same time, the resilient engagement pieces 6a and 6b are snap fitted into the associated notches 13a and 13b, and this not only properly positions the first fastener half 1 at a prescribed position but also prevents the clip 4 from moving along the peripheral edge of the flange 12.

Figure 4:
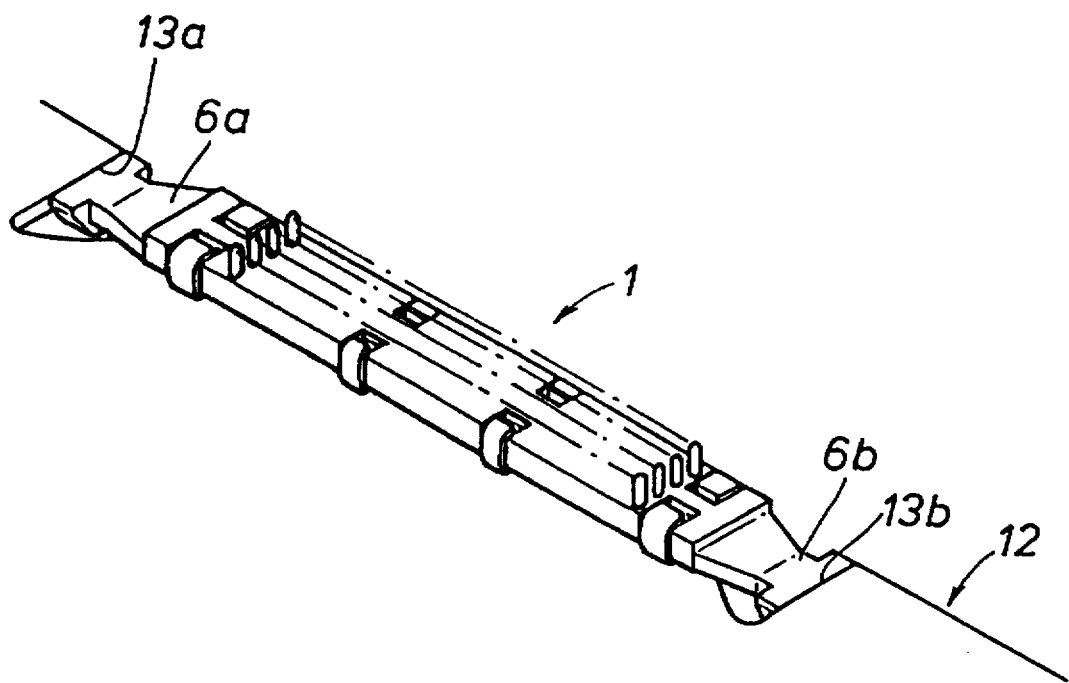
FIG. 4 is a perspective view of the first fastener half when it is fitted on the internal flange of the windshield opening of the vehicle body.

Meanwhile, the other half of the fastener assembly or the second fastener half 17 (FIG. 2) is attached to the inner surface of the peripheral edge of the windshield 14 by using a two-sided adhesive tape 16 or the like, and is pushed against the first fastener half 1 already attached to the vehicle body with a bonding agent filled in the gap between the inner surface of the peripheral edge of the windshield 14 and the flange 12. The fastener assembly thus performs its function to temporarily but firmly secure the windshield 14 to the vehicle body (see FIG. 4).

Figure 5:
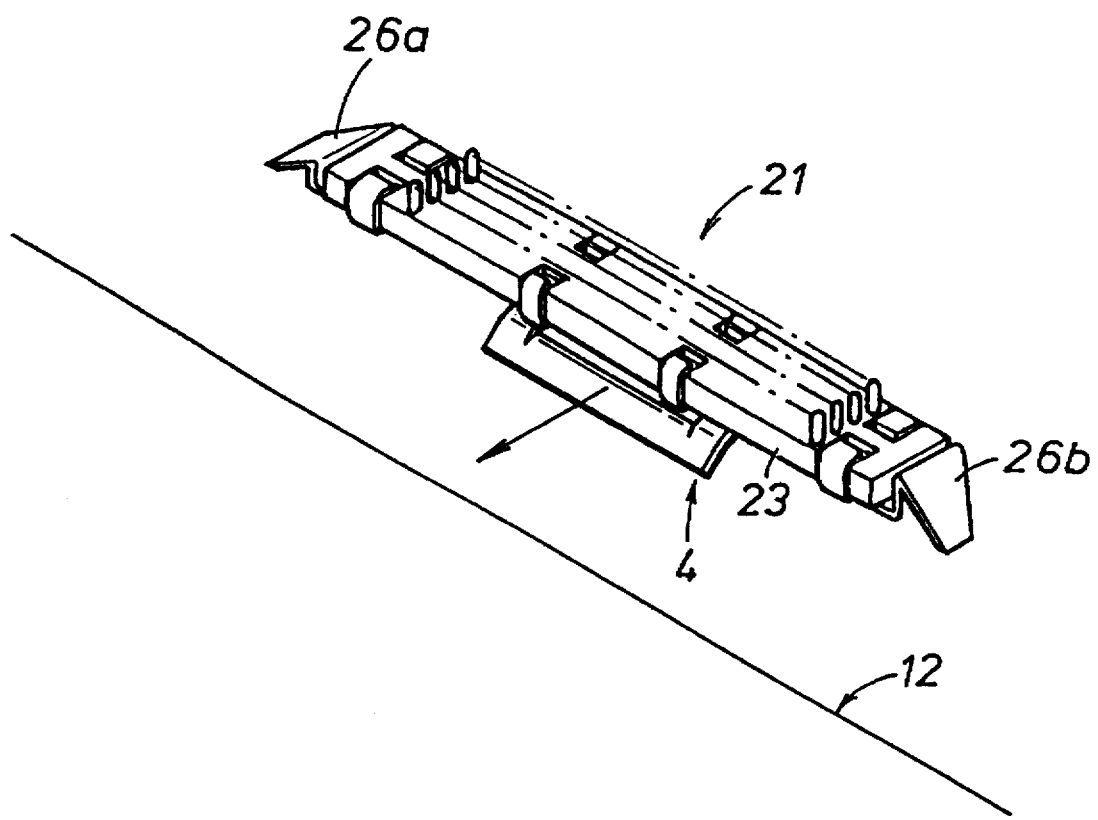
FIG. 5 is a view similar to FIG. 3 showing the first fastener half of a second embodiment of the present invention.

FIG. 5 is a view similar to FIG. 3 showing a second embodiment of the present invention. In FIG. 5, the parts corresponding to those of the first embodiment are denoted with like numerals, and detailed description of some of such parts are omitted.

In this embodiment, the flange 12 of the vehicle body is not provided with any special feature. A pair of metallic claws 26a and 26b which are integral with the clip 4 and urged toward the surface of the flange 12, are provided on either longitudinal end, or either terminal end with respect to the direction parallel to the peripheral edge of the flange 12, of the base 23 of the fastener half 21 similar to that of the first embodiment. These claws 26a and 26b extend obliquely along the flange 12 in such a manner that once the clip 4 is fitted onto the edge of the flange 12 these claws are pressed onto the flange 12 in the same manner as the barbs 7 of the clip 4 and the fastener half 21 is not only securely attached to the flange 12 but also prevented from moving along the edge of the flange 12 along with the clip 4. In particular, because each of the claws 26a and 26b comprises a vertical portion which rises from the base supporting portion 5a of the clip 4 away from the flange 12, and an oblique portion extending from the upper end of the vertical portion obliquely toward the flange 12, any relative longitudinal movement between the second fastener half 21 and the flange 12 would cause the oblique portion of either one of the claws 26a and 26b to be progressively firmly wedged against the flange 12.

Figure 6:
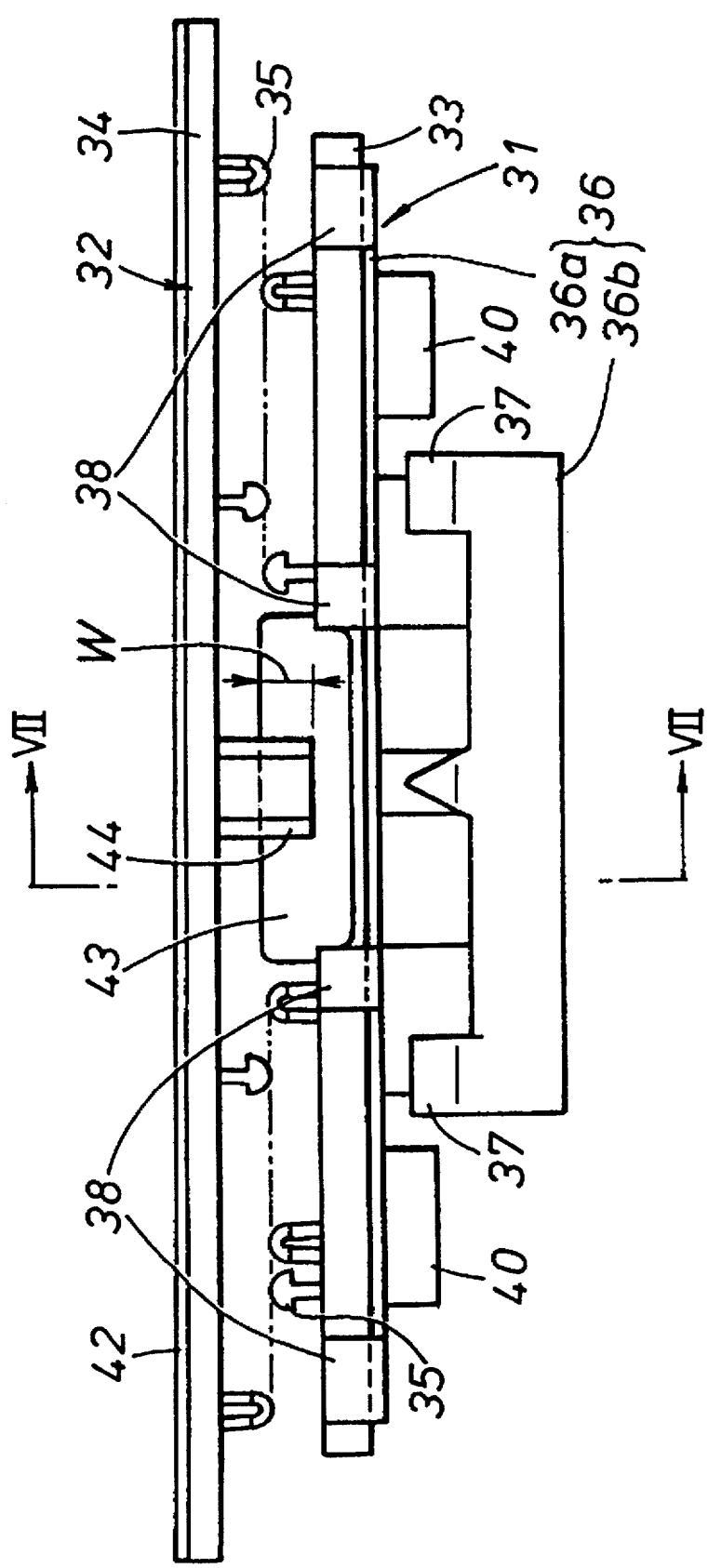
FIG. 6 is a front view of a third embodiment of the fastener assembly for temporarily securing a windshield according to the present invention.
Figure 7:
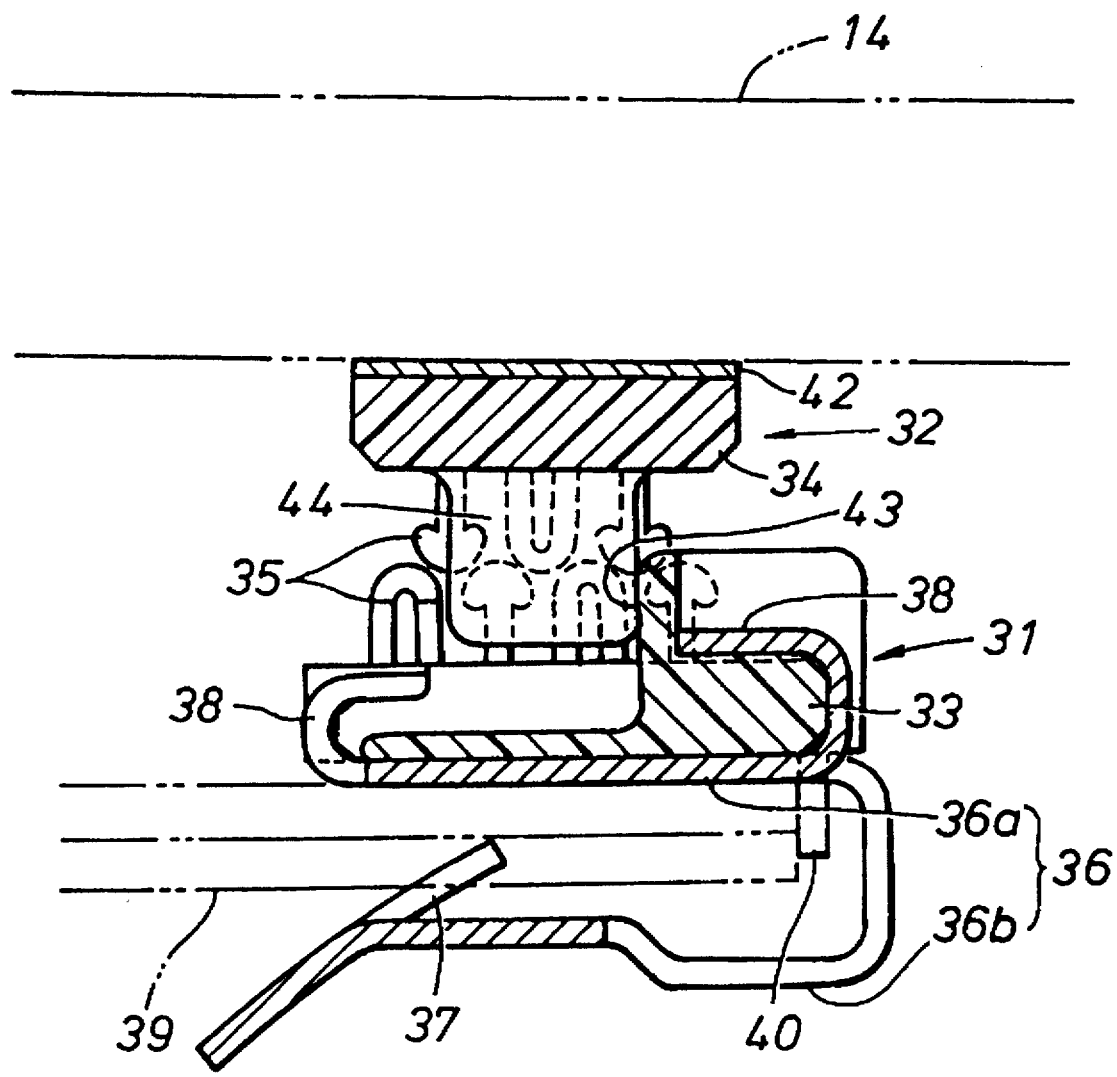
FIG. 7 is a sectional view taken along line VII—VII of FIG. 6.
Figure 8:
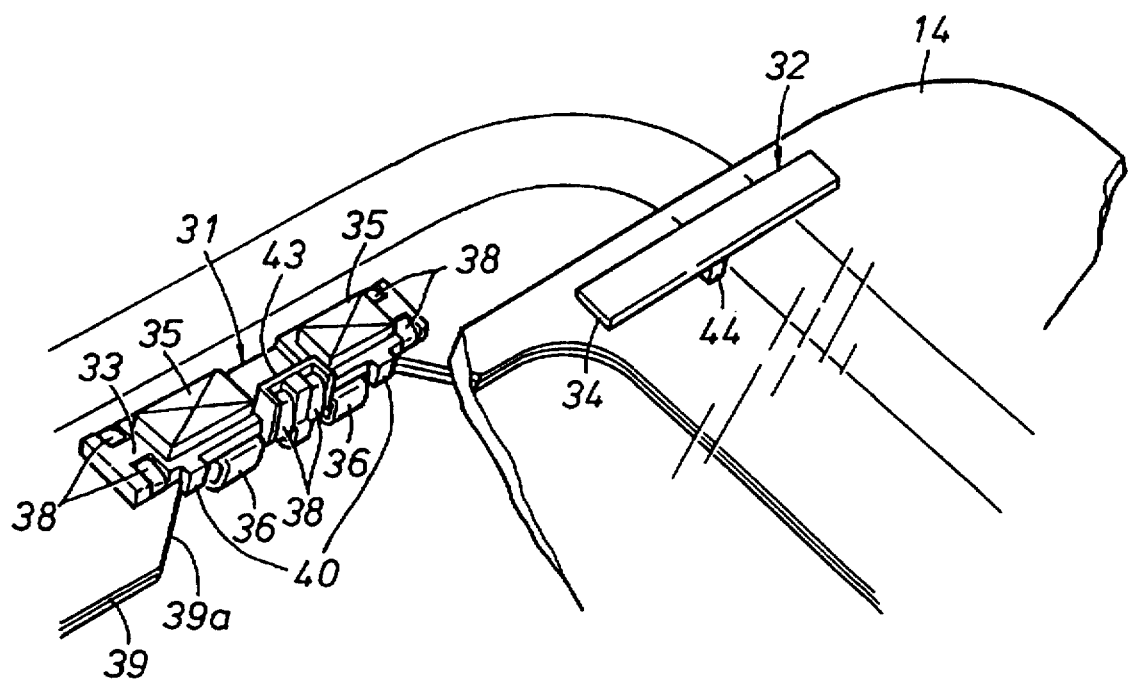
FIG. 8 is a perspective view showing the two fastener halves of the third embodiment as they are to be joined together.

FIGS. 6 through 8 show a third embodiment of the fastener assembly for temporarily securing a windshield according to the present invention. This fastener assembly comprises a first fastener half 31 to be mounted on the vehicle body, and a second fastener half 32 to be mounted on the windshield 14, each of which comprises a base 33 or 34 consisting of a plastic strip, and a multitude of mushroom-shaped projections 35 arranged on one planar surface of the base 33 or 34 in both lateral and longitudinal regular rows.

The first fastener half 31 is provided with a metallic clip 36. This clip 36 is formed by bending a T-shaped sheet metal so as to have a U-shaped cross section, and consists of a relatively broad base mounting portion 36a, and a clamping portion 36b provided with inwardly directed barbs 37 formed by cutting out both the lateral ends thereof. The base 33 and the clip 36 are securely joined together by placing the base 33 on the base mounting portion 36a and crimping a plurality of tabs 38 provided on the base mounting portion 36a onto the base 33.

When this clip 36 of the first fastener half 31 is fitted onto an edge of an internal flange 39 of an upper end of a windshield frame of the vehicle body, the barbs 37 are pressed onto the flange 39, and the clip 36 along with the first fastener half 31 is securely engaged to the flange 39. Positioning projections 40 are provided on an edge of the base 33 so as to engage an edge of the flange 39 and accurately position the first fastener half 31 on the flange 39. The clip 36 is fitted on a part of the internal flange 39 located in a notch 39a flanked by a pair of slanted side edges so that the metallic clip 36 may be positioned centrally into the notch 39a, guided by the slanted side edges, as the metallic clip 36 is fitted onto a peripheral edge of a part of the internal flange 39 situated in the notch 39a.

The positioning projections 40 may also be provided on the base mounting portion 36a of the clip 36.

Meanwhile, the second fastener half 32 is attached to a part of the inner surface of the peripheral edge of the windshield 14 corresponding to the mounting position of the first fastener half 31 by using a two-sided adhesive tape 42 or the like.

A seat surface 43 extending in the lateral direction of the vehicle body is placed on the one planar surface of the base 33 at a position corresponding to a middle part of the lower edge of the first fastener half 31 so as to stand upright therefrom. A projection 44 substantially smaller as compared to the width of the seat surface 43 is provided in a middle part of the second fastener half 32. The elevations of the seat surface 43 and the projection 44 are selected so that the seat surface 43 and the projection 44 overlap each other (by dimension W indicated in FIG. 6) when the mushroom-shaped projections 35 of the two fastener halves 31 and 32 are joined together. Thus, when the windshield 14 is placed on the flange 39, the seat surface 43 and the projection 44 engage each other, and prevents any vertical shifting of the windshield 14.

Furthermore, according to this structure, because the projection 44 can move within the range permitted by the width of the seat surface 43, it is possible to laterally adjust the position of the windshield 14 before the mushroom-shaped projections 5 of the two fastener halves 31 and 32 are joined together.

Thus, when the second fastener half 32 is pushed onto the first fastener half 31 after filling a bonding agent in the gap between the inner surface of the peripheral edge of the windshield 14 and the flange 39, the mushroom-shaped projections 35 of the two fastener halves 31 and 32 are joined together, and the windshield 14 is temporarily secured to the flange 39 so as not to shift relative to the flange 39.

In the above described embodiment, the seat surface 43 and the projection 44 were provided in the central parts of the respective bases 33 and 34, but may be provided on parts which are offset toward one of the terminal ends.

Figure 9:
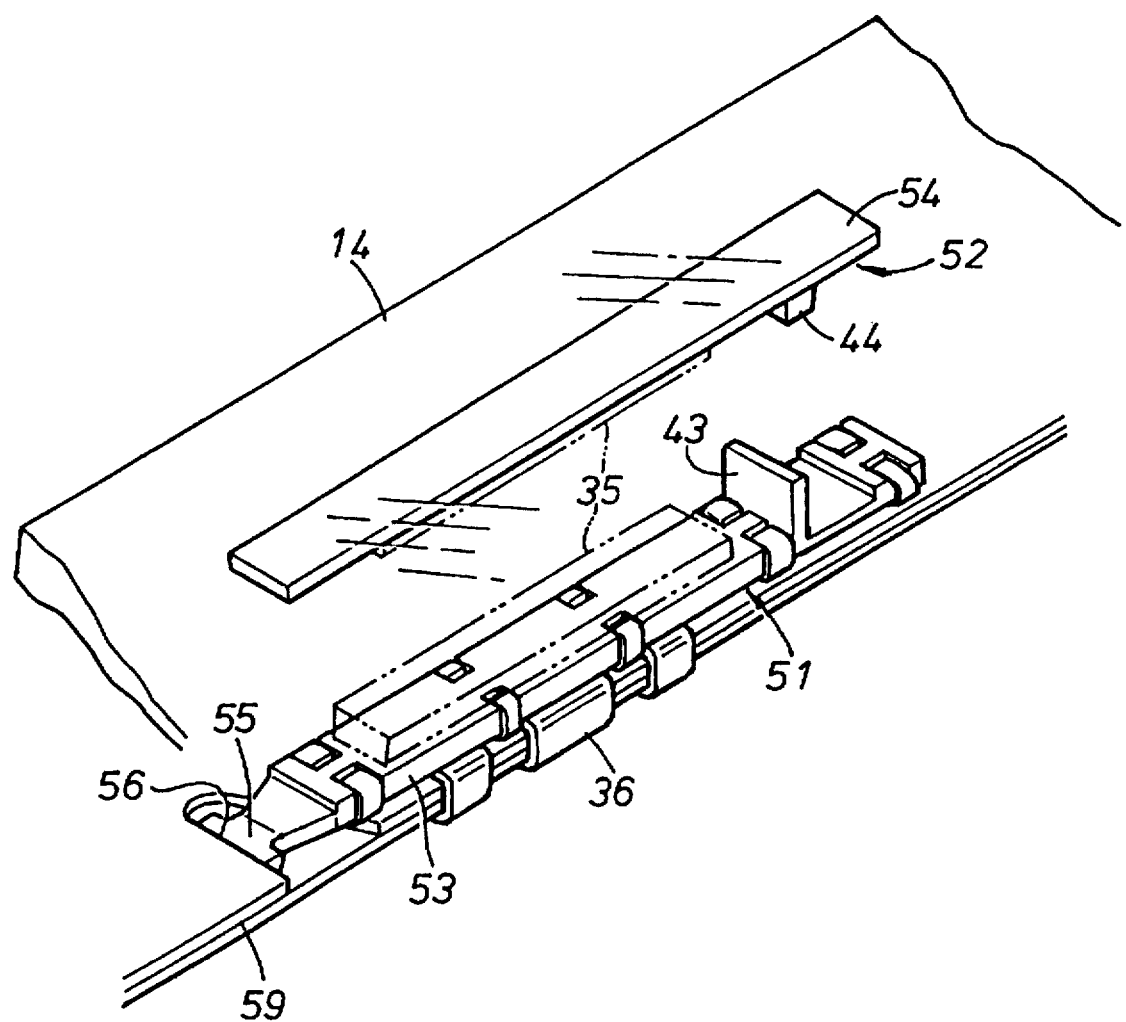
FIG. 9 is a perspective view similar to FIG. 8 showing a fourth embodiment of the fastener assembly for temporarily securing a windshield according to the present invention.

FIG. 9 shows a fourth embodiment of the present invention. In this embodiment, the first fastener half 51 is adapted to be mounted on an internal flange 59 on a side edge of a windshield frame of a vehicle body, but the structure is otherwise similar to that of the previous embodiment. Therefore, the parts corresponding to those of the third embodiment are denoted with like numerals, and detailed description of some of such parts are omitted.

The lower end of the base 53 of the first fastener half 51 for a side edge is provided with a resilient piece 55. The flange 59 of the windshield frame of the vehicle body consists of two layers of steel panels, and the front panel is provided with a notch 56 for engaging the resilient piece 55. By virtue of the notch 56 engaging the resilient piece 55, the vertical position of the first fastener half 51 can be accurately determined.

In this case, the seat surface 43 is provided on the upper end of the base 53, and a corresponding projection 44 depending from the lower surface of the base 54 of the second fastener half 52 is engaged by this seat surface 43 to prevent the second fastener half 52 from shifting downward in the same way as the previous embodiment.

Thus, according to the present invention, because the first fastener half is provided with means for preventing movement relative to the flange of the vehicle body on which the windshield is to be mounted, and the fastener assembly is thereby prevented from shifting along and/or across the peripheral edge of the flange, substantial improvements can be achieved in simplifying the fabrication process and in increasing the reliability in temporary attachment. According to the structure involving the use of a combination of recesses provided in the flange and the resilient engagement pieces adapted to be engaged by these recesses, positioning of the fastener can be also simplified. When the fastener assembly is used on a side edge of a windshield frame, a combination of a single recess and an associated single resilient engagement piece is sufficient for securing the windshield because the gravitational force of the windshield is dominant, and only the sagging of the windshield is needed to be prevented. According to the structure using a pair of claws which are urged toward the flange and pressed onto the flange surface, the shifting of the fastener can be avoided even without providing any special structure to the flange of the vehicle body, and the fabrication process can be even more simplified.

Furthermore, according to the present invention, because the windshield can be prevented from shifting vertically when it is placed on the windshield frame, it is possible to properly position the windshield before engaging the fastener assembly for temporary securing, and the efficiency of the assembling work can be substantially improved.

Although the present invention has been described in terms of specific embodiments, it is possible to modify and alter details thereof without departing from the spirit of the present invention.

What we claim is:

1. A fastener assembly for temporarily securing a windshield when mounting the windshield on a vehicle body, comprising:

a first fastener half having first attaching means on one surface thereof for securely attaching said first fastener half to an upper edge of an internal flange of a windshield frame of the vehicle body, and first engagement means on another surface thereof; and a second fastener half having second attaching means on one surface thereof for securely attaching said second fastener half to an Upper peripheral edge of the windshield, and a second engagement means provided on another surface thereof and adapted to be readily engaged and disengaged with and from said first engagement means;

said first fastener half being provided with locating means for preventing lateral movement of said first fastener half along a peripheral edge of the internal flange;

wherein said fastener halves includes means for preventing downward shifting of said second fastener half with respect to first fastener half when said first and second engagement means are engaged;

said first attaching means comprises a metallic clip including a resilient clamp piece which clamps the internal flange between said resilient clamp piece and a main part of said fastener half;

wherein said metallic clip is provided with a barb which opposes a movement of said metallic clip directed across a peripheral edge of the internal flange; and wherein said locating means includes a notch formed in the internal flange and having a pair of slanted side edges so that said metallic clip may be positioned centrally into the notch, guided by said slanted side edges, as said metallic clip is fitted onto a peripheral edge of a part of the internal flange situated in the notch.

2. A fastener assembly for temporarily securing a windshield when mounting the windshield on a vehicle body, comprising:

a first fastener half having first attaching means on one surface thereof for securely attaching said first fastener half to an upper edge of an internal flange of a windshield frame of the vehicle body, and first engagement means on another surface thereof; and a second fastener half having second attaching means on one surface thereof for securely attaching said second fastener half to an upper peripheral edge of the windshield, and a second engagement means provided on another surface thereof and adapted to be readily engaged and disengaged with and from said first engagement means;

said first fastener half being provided with locating means for preventing lateral movement of said first fastener half along a peripheral edge of the internal flange;

wherein said fastener halves includes means for preventing downward shifting of said second fastener half with respect to first fastener half when said first and second engagement means are engaged; and wherein said locating means includes a notch in the internal flange and a pair of projections on said first fastener half for preventing lateral movement of said first fastener half relative to the peripheral edge of the internal flange.

* * * * *